(12) United States Patent
Morris

(10) Patent No.: US 11,155,218 B2
(45) Date of Patent: Oct. 26, 2021

(54) UTILITY RACK

(71) Applicant: William Richard Morris, Colfax, WA (US)

(72) Inventor: William Richard Morris, Colfax, WA (US)

(*) Notice: Subject to any disclaimer, the term of this patent is extended or adjusted under 35 U.S.C. 154(b) by 0 days.

(21) Appl. No.: 16/948,065

(22) Filed: Aug. 28, 2020

(65) Prior Publication Data

US 2021/0061188 A1   Mar. 4, 2021

Related U.S. Application Data

(60) Provisional application No. 62/894,262, filed on Aug. 30, 2019.

(51) Int. Cl.
*B60R 11/06* (2006.01)
*B60R 9/06* (2006.01)
*B60R 11/00* (2006.01)

(52) U.S. Cl.
CPC ............... *B60R 11/06* (2013.01); *B60R 9/06* (2013.01); *B60R 2011/004* (2013.01); *B60R 2011/0059* (2013.01)

(58) Field of Classification Search
CPC ..... B60R 9/06; B60R 11/06; B60R 2011/004; B60R 2011/0059
USPC ................. 224/401, 538, 524; D12/107, 407
See application file for complete search history.

(56) References Cited

U.S. PATENT DOCUMENTS

| | | | | |
|---|---|---|---|---|
| 4,247,030 A | * | 1/1981 | Amacker | B60R 9/00 180/210 |
| 4,277,008 A | * | 7/1981 | McCleary | B62K 27/12 224/401 |
| 4,473,176 A | * | 9/1984 | Harper | B25H 3/006 206/349 |
| D288,193 S | * | 2/1987 | Caron | D12/412 |
| 4,846,385 A | * | 7/1989 | Fratus | B23Q 13/00 224/569 |
| 4,907,778 A | * | 3/1990 | Rockwell | B23D 63/003 24/327 |
| 4,915,437 A | * | 4/1990 | Cherry | B60R 11/06 108/44 |
| 5,007,568 A | * | 4/1991 | Da Vault | B23Q 13/00 211/4 |
| 5,372,289 A | * | 12/1994 | Dachicourt | B60R 7/02 224/281 |
| 5,676,292 A | * | 10/1997 | Miller | B60R 9/06 224/282 |
| D387,327 S | * | 12/1997 | Ethridge | D12/423 |

(Continued)

OTHER PUBLICATIONS

Turnkey UTV LLC, "Can Am Commander Expedition Series Cargo Basket", retrieved on Mar. 29, 2019 at <<https://www.turnkeyutv.com/commander/storage-accessories/can-am-commander-expedition-series-cargo-basket>>, 4 pages.

*Primary Examiner* — Justin M Larson

(74) *Attorney, Agent, or Firm* — Lee & Hayes, P.C.

(57) ABSTRACT

A utility rack configured for use on a vehicle. The utility rack may include a base, storage surface, and rails coupled to the base via supports. The storage surface may be configured to hold various types of equipment, boxes, and the like. The utility rack may additionally include, on a bottom side of the base, a housing for a storage container and a housing for utility equipment. In at least one example, the storage container may be configured to house liquids, such as gasoline or diesel fuel for the vehicle.

17 Claims, 13 Drawing Sheets

(56) References Cited

U.S. PATENT DOCUMENTS

| | | | | |
|---|---|---|---|---|
| 5,806,736 A * | 9/1998 | Kincart | B62D 43/02 | |
| | | | 224/42.13 | |
| D434,718 S * | 12/2000 | Kreisler | D12/412 | |
| D435,510 S * | 12/2000 | Quidort | D12/412 | |
| 6,196,605 B1 * | 3/2001 | Baidas | B60R 7/046 | |
| | | | 224/543 | |
| 6,378,748 B1 * | 4/2002 | Cox | B60R 9/06 | |
| | | | 224/401 | |
| D459,287 S | 6/2002 | Beard et al. | | |
| 6,505,874 B2 * | 1/2003 | Ando | B60R 5/04 | |
| | | | 296/37.16 | |
| 6,648,152 B2 * | 11/2003 | Bermes | B25H 3/006 | |
| | | | 211/175 | |
| 7,044,526 B2 * | 5/2006 | Tweet | B60P 3/14 | |
| | | | 224/401 | |
| 7,303,221 B2 * | 12/2007 | Takahashi | B60R 11/00 | |
| | | | 296/37.1 | |
| D586,287 S | 2/2009 | McBride | | |
| D593,927 S | 6/2009 | Walton et al. | | |
| 7,762,510 B2 * | 7/2010 | Eller | B27B 17/0008 | |
| | | | 248/309.1 | |
| 8,162,193 B2 * | 4/2012 | Gang | B60R 9/06 | |
| | | | 224/526 | |
| 8,474,561 B2 * | 7/2013 | Allingham | B62K 5/01 | |
| | | | 180/89.11 | |
| 8,646,668 B2 * | 2/2014 | Oakes | B60R 9/065 | |
| | | | 224/401 | |
| D713,775 S | 9/2014 | Lagermann | | |
| 8,839,998 B1 | 9/2014 | Robinson | B60R 11/06 | |
| | | | 224/403 | |
| D743,870 S | 11/2015 | Galley et al. | | |
| D754,055 S | 4/2016 | Harrison | | |
| 9,533,623 B2 * | 1/2017 | Descoteaux | B62B 3/02 | |
| 9,586,629 B2 * | 3/2017 | Leitner | B60R 11/06 | |
| D817,852 S * | 5/2018 | Mifsud | D12/406 | |
| 9,994,163 B2 * | 6/2018 | Wheeler | B60R 19/48 | |
| D841,564 S * | 2/2019 | Sartin | D12/406 | |
| 10,202,081 B2 * | 2/2019 | Krishnan | B60R 5/045 | |
| 10,245,752 B2 * | 4/2019 | Zeno | B25H 3/006 | |
| D856,900 S | 8/2019 | Baumann | | |
| D871,308 S * | 12/2019 | Ronca | D12/407 | |
| D881,790 S | 4/2020 | Ni et al. | | |
| D881,791 S | 4/2020 | Ni et al. | | |
| D883,182 S | 5/2020 | Fonnesbeck | | |
| 10,676,042 B2 * | 6/2020 | Wheeler | B60R 19/48 | |
| D894,091 S * | 8/2020 | Morris | D12/412 | |
| 10,759,351 B2 * | 9/2020 | Westcott | B60D 1/52 | |
| D899,346 S * | 10/2020 | Morris | D12/412 | |
| 10,793,200 B2 * | 10/2020 | Leitner | B62D 33/0207 | |
| 10,829,056 B2 * | 11/2020 | Pratka | B60P 7/135 | |
| 10,899,284 B2 * | 1/2021 | Descoteaux | B62D 33/023 | |
| 2001/0006180 A1 * | 7/2001 | Cutajar | B60R 9/06 | |
| | | | 224/319 | |
| 2003/0080263 A1 * | 5/2003 | McCoy | B60D 1/485 | |
| | | | 248/205.1 | |
| 2003/0213881 A1 * | 11/2003 | McCoy | B60P 3/40 | |
| | | | 248/309.1 | |
| 2004/0079779 A1 * | 4/2004 | Essig | B60R 9/00 | |
| | | | 224/550 | |
| 2004/0118890 A1 * | 6/2004 | Adams | B60R 9/06 | |
| | | | 224/518 | |
| 2005/0092796 A1 | 5/2005 | Essig | | |
| 2006/0011754 A1 * | 1/2006 | Farmer | B60R 9/00 | |
| | | | 239/722 | |
| 2006/0163299 A1 * | 7/2006 | Corlett | B62D 43/02 | |
| | | | 224/401 | |
| 2008/0041904 A1 * | 2/2008 | Price | B60R 9/06 | |
| | | | 224/519 | |
| 2013/0200122 A1 * | 8/2013 | Elson | B60R 9/06 | |
| | | | 224/401 | |
| 2015/0021371 A1 * | 1/2015 | Ward | B60R 9/06 | |
| | | | 224/499 | |
| 2021/0061188 A1 * | 3/2021 | Morris | B60R 11/06 | |

\* cited by examiner

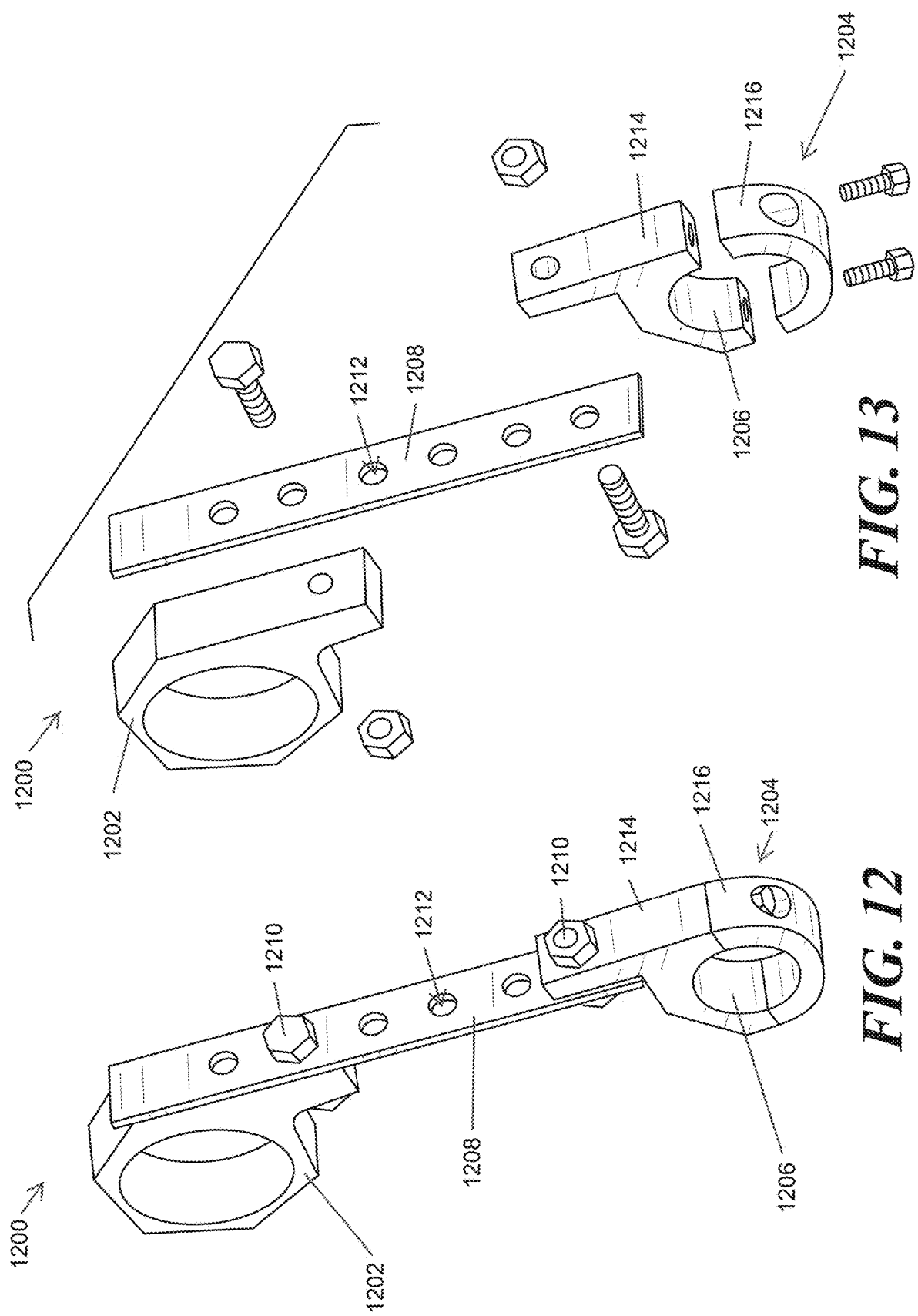

UTILITY RACK

PRIORITY

This application is a continuation of and claims priority to U.S. Provisional Patent Application No. 62/894,262, filed Aug. 30, 2019 and entitled "Utility Rack," the entire contents of which are incorporated herein by reference.

BACKGROUND

Racks are commonly used in conjunction with vehicles to carry additional cargo that may not fit within the vehicles. Traditionally, racks are designed to attach to a tow hitch mount or a roof mounting system. However, this traditional rack mounting system may not be viable for smaller vehicles and/or vehicles without tow hitch mounts or roof rack mounts.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 12 depicts an example adjustable rear coupling mechanism for use on a utility rack.

FIG. 13 is an exploded view of components of the adjustable rear coupling mechanism of FIG. 12.

DETAILED DESCRIPTION

This disclosure is generally directed to a utility rack. The utility rack may comprise a storage surface (e.g., storage area) coupled to a base, and one or more rails coupled to the base via vertical supports. The utility rack may be configured to couple to a vehicle via one or more rear coupling mechanisms and/or one or more side coupling mechanisms. The rear and/or side coupling mechanisms may be fixed and/or adjustable. In various examples, the utility rack may be configured to house a storage container and/or utility equipment. In such examples, the utility rack may include a housing for the storage container and/or the utility equipment, the housing being coupled to the base and located underneath the storage surface.

In various example, the utility rack may be coupled to the vehicle by securing a first rear coupling of the utility rack to a first component of the vehicle, and a second rear coupling of the utility rack to the first component of the vehicle. The utility rack may further me coupled to the vehicle by securing a first side coupling of the utility rack to a second component of the vehicle and a second side coupling of the utility rack to a third component of the vehicle. In various examples, a storage container may be inserted into a first housing of the utility rack and a blade of a chainsaw may be inserted into a second housing of the utility rack.

The apparatuses and techniques described herein may be implemented in a number of ways. Example implementations are provided below with reference to the following figures.

Figure 1:
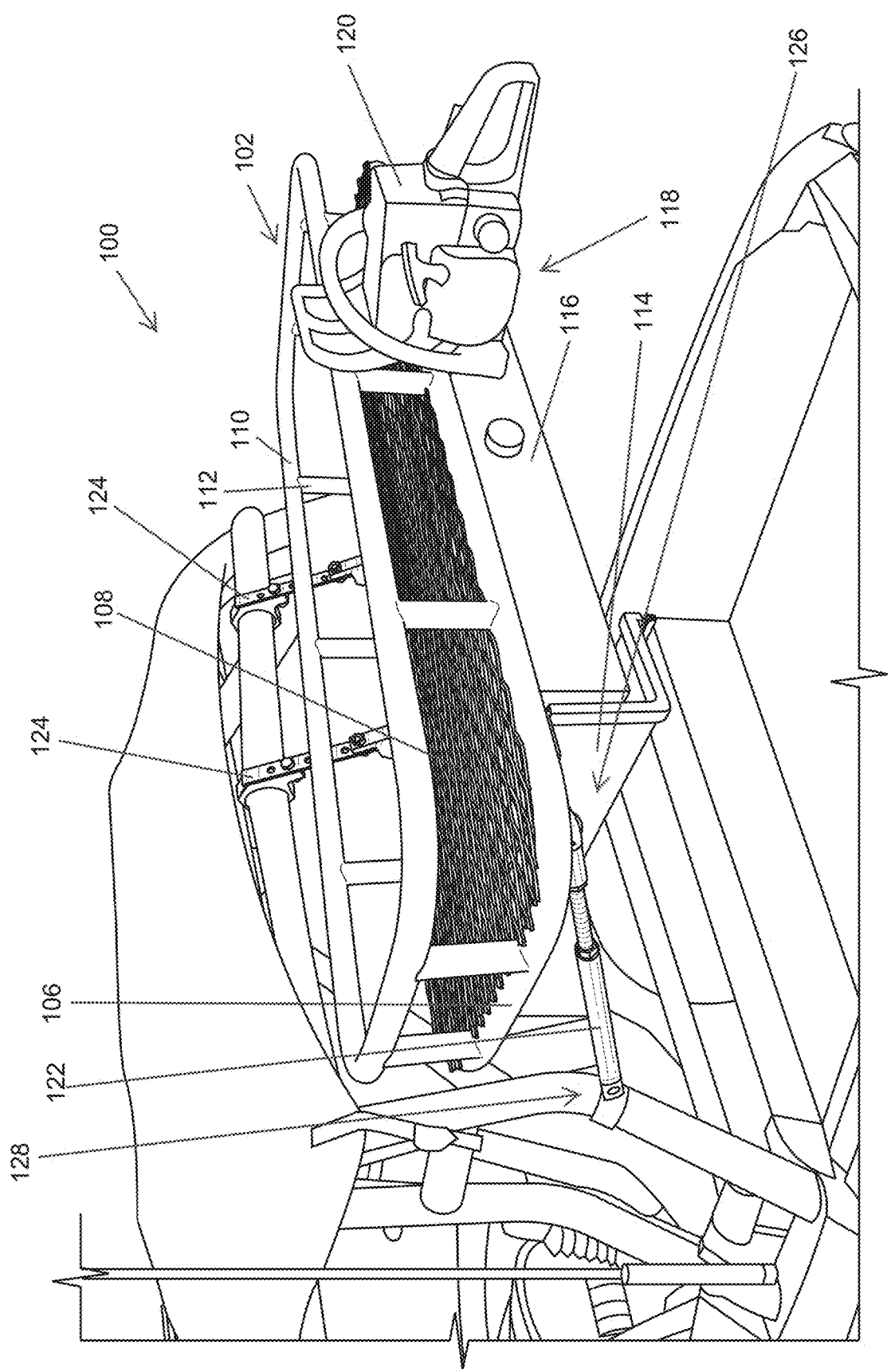
FIG. 1 is a perspective view of an example utility rack with adjustable coupling mechanisms mounted on a utility vehicle.

FIG. 1 is a perspective view of utility vehicle 100 on which an example utility rack 102 may be mounted. The utility rack 102 may comprise a base 106, storage surface 108, and a rail 110 coupled to the base 106 via supports 112. Though illustrated as a substantially rectangular shape with rounded corners, the base 106 and/or rail 110 may include any other shape, such as substantially square, ovular, circular, hexagonal, octagonal, or the like. In various examples, the utility rack 102 may include a first housing 114 for a storage container 116 and a second housing 118 for utility equipment 120.

In various examples, the components of the utility rack 102 may be manufactured via traditional manufacturing techniques. In some embodiments, the components may be manufactured by 3-D manufacturing techniques, casting, molding, forming, machining, composite manufacturing, or any other method of manufacturing. In some embodiments, the metal may be hardened during the manufacturing process.

In various examples, the base 106, the storage surface 108, the rail 110, the supports 112, and the housings 114 and 118 may comprise a metal material (e.g., aluminum, steel, stainless steel, titanium, iron, alloys thereof, etc.), a plastic material (e.g., high-density polyethylene, acrylic, melamine, polycarbonate, etc.), a composite material (e.g., fiberglass, carbon fiber, etc.), or combinations of the foregoing. In some embodiments, the base 106, the rail 110, and the supports 112 may be cast, formed or machined as a solid piece. In various examples, the base 106, the rail 110, and/or the supports 112 may be welded together. In some examples, the base 106, the rail 110, and/or the supports 112 may be coupled together with other coupling mechanisms, such as screws, bolts, glue, rope, or the like.

In various examples, the storage surface 108 may be coupled to the base 106 utilizing welding techniques and/or via the other coupling mechanisms. As illustrated, the storage surface 108 may be coupled to a top surface of the base 106. In some examples, the storage surface 108 may be coupled to a bottom side of the base 106. In some examples, the storage surface 108 may be coupled a portion of the base 106 in between the top surface and the bottom surface. In various examples, the first housing 114 and the second housing 118 may be coupled to the base 106 and/or the storage surface 108. In such examples, the coupling may include one or more welds, bolts, screws, glue, rope, or the like.

In various examples, the first housing 114 may be configured to house a storage container 116. The storage container 116 may include a plastic, metal, and/or composite container configured for storing liquid and/or solid material. In at least one example, the storage container 116 may be configured to carry liquid materials, such as water, gasoline, diesel, or the like. The storage container 116 may be detachably coupled to the first housing 114, such that it is capable of being removed and/or replaced.

In various examples, the second housing 118 may be configured to house utility equipment 120. The utility equipment 120 may be detachably coupled to the second housing 118, such that it may be removed and replaced. As will be shown in greater detail below, the second housing 118 may include an opening configured to house at least a portion of the utility equipment 120 (e.g., chain saw, jaw saw, hedge trimmer, shears, and/or any other equipment). In the illustrative example, a blade of a chainsaw is inserted into the second housing 118, though this is merely for illustrative purposes, and it is contemplated that the second housing 118 may be configured to detachably couple any variety of utility equipment to the utility rack 102.

As illustrated in FIG. 1, the utility rack 102 may be coupled to the vehicle 100 via side coupling mechanisms 122 and rear coupling mechanisms 124. The side coupling mechanisms 122 and the rear coupling mechanisms 124 may comprise a metal material, a plastic material, a composite material, or combinations of the foregoing. In the illustrative example, the side coupling mechanisms 122 and the rear coupling mechanisms 124 are adjustable (e.g., a length thereof is adjustable). In such examples, the utility rack 102 may be configured for use on various vehicles of different sizes and/or shapes. As will be discussed below with respect to FIG. 2, the side coupling mechanisms 122 and/or the rear coupling mechanisms 124 may be fixed in length (e.g., not adjustable longitudinally), fixed laterally and/or rotationally. In such examples, the utility rack 102 may be configured for use on a particular vehicle (e.g., make, model, etc.). The side coupling mechanisms 122 and the rear coupling mechanisms 124 may couple to various components of the vehicle 100, such as a roll bar, support beam/bar, attachment point, or the like. In at least one example, two or more rear coupling mechanisms 124 may couple to a same component and each of the side coupling mechanisms 122 may couple to different components of the vehicle 100.

In various examples, the side coupling mechanism 122 may couple to the base 106 and/or the first housing 114 via a first coupling 126. The first coupling 126 may include a screw, bolt, band (e.g., rubber band, plastic band, etc.), rope, or other type of coupling. In some examples, side coupling mechanism 122 may couple to a component of the vehicle 100 via a second coupling 128. The second coupling 128 may include a screw, bolt, band (e.g., rubber band, plastic band, etc.), rope, or other type of coupling. In the illustrative example, the side coupling mechanism 122 may couple to the vehicle 100 (or component thereof) via a column bracket and a screw. In other examples, the side coupling mechanism 122 may couple to the vehicle 100 via a different type of bracket and/or coupling, such as a direct coupling (e.g., bolt, snap-fit connector, etc.) to a surface of the vehicle 100.

The side coupling mechanisms 122 and the rear coupling mechanisms 124 will be described in further detail below with respect to FIGS. 11-13.

Figure 2:
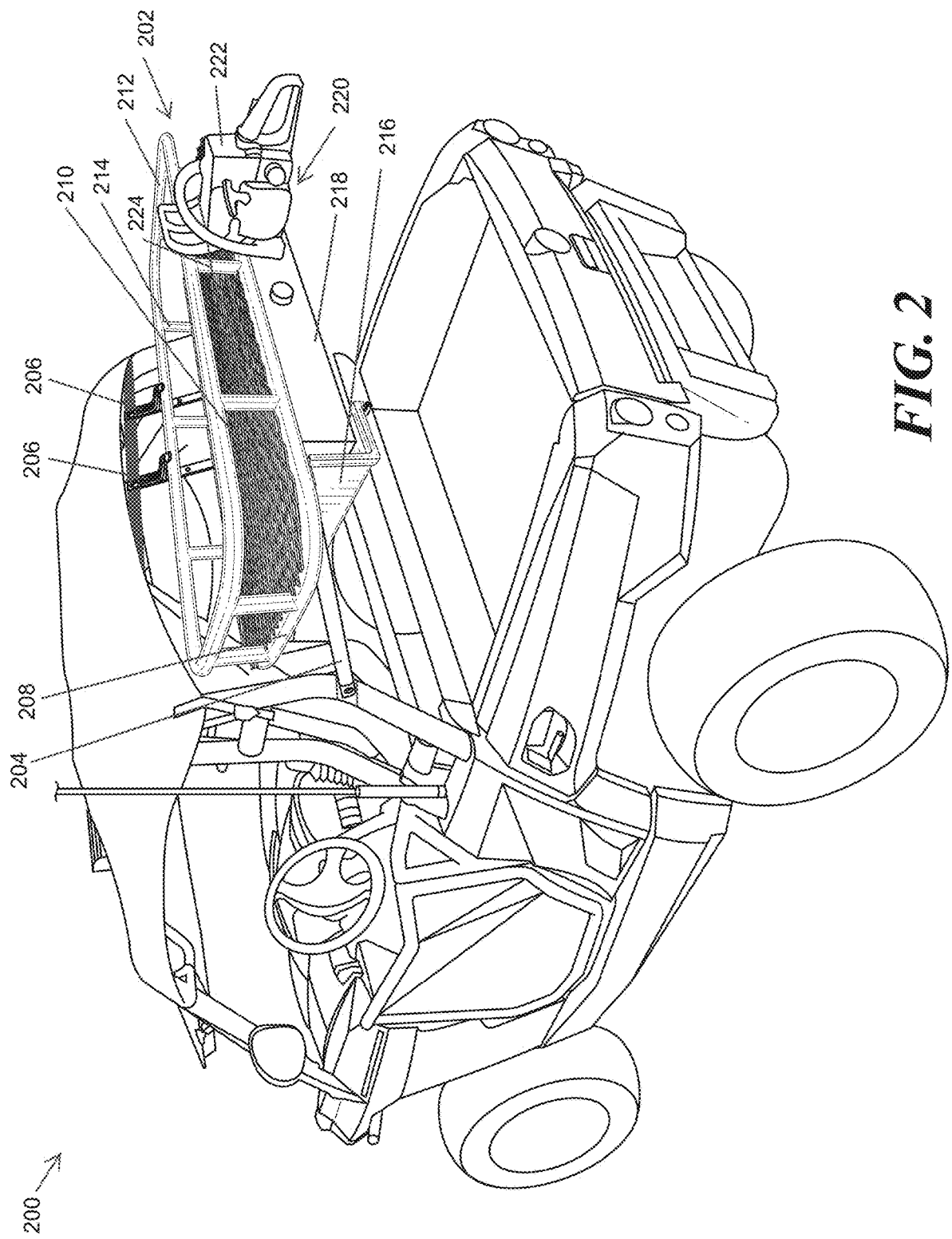
FIG. 2 is a perspective view of a utility vehicle with an example utility rack with fixed coupling mechanisms mounted thereon.

FIG. 2 is a perspective view of a utility vehicle 200 on which example utility rack 202 may be mounted. The utility rack 202, such as utility rack 102, may be mounted on the utility vehicle 200 via fixed side coupling mechanisms 204 and fixed rear coupling mechanisms 206 mounted on a utility vehicle. In various examples, the utility rack 202, similar to utility rack 102 may include a base 208, a storage surface 210, a rail 212, and supports 214. Though illustrated as a substantially rectangular shape with rounded corners, the base 208 and/or rail 212 may include any other shape, such as substantially square, ovular, circular, hexagonal, octagonal, or the like. In various examples, the utility rack may include a first housing 216 for a storage container 218 and a second housing 220 for utility equipment 222.

In various examples, the components of the utility rack 202 may be manufactured via traditional manufacturing techniques. In some embodiments, the components may be manufactured by 3-D manufacturing techniques, casting, molding, forming, machining, composite manufacturing, or any other method of manufacturing. In some embodiments, the metal may be hardened during the manufacturing process.

In various examples, the base 208, the storage surface 210, the rail 212, the supports 214, and the housings 216 and 220 may comprise a metal material (e.g., aluminum, steel, stainless steel, titanium, iron, alloys thereof, etc.), a plastic material (e.g., high-density polyethylene, acrylic, melamine, polycarbonate, etc.), a composite material (e.g., fiberglass, carbon fiber, etc.), or combinations of the foregoing. In some embodiments the base 208, the rail 212, the supports 214 may be cast, formed or machined as a solid piece. In various examples, the base 208, the rail 212, and/or the supports 214 may be welded together. In some examples, the base 208, the rail 212, and/or the supports 214 may be coupled together with other coupling mechanisms, such as screws, bolts, glue, rope, or the like.

In various examples, the storage surface 210 may be coupled to the base utilizing welding techniques and/or via the other coupling mechanisms (e.g., bolts, screws, glue, rope, etc.). Although illustrated as extending substantially the length and width of the base 208, in other examples, the storage surface 210 may extend vertically from the base 208 to the rail 212. In such examples, the storage surface 210 may be coupled to the base, the rail 212, and/or one or more supports 214 and may be configured to prevent small items (e.g., items smaller than the distance between the base 208 and the rail 212) from falling out of the utility rack 202. In various examples, the first housing 216 and the second housing 220 may be coupled to the base 208 and/or the storage surface 210. In such examples, the coupling may include one or more welds, bolts, screws, glue, rope, or the like.

In various examples, the first housing 216 may be configured to house a storage container 218. The first housing 216 and components thereof will be described in greater detail below with respect to FIG. 3. The storage container 218 may include a plastic, metal, and/or composite container configured for storing liquid and/or solid material. In at least one example, the storage container 218 may be configured to carry liquid materials, such as water, gasoline, diesel, or the like. The storage container 218 may be detachably coupled to the first housing 216, such that it is capable of being removed and/or replaced. In some examples, the storage container 218 may be securely housed in the first housing 216 by a locking mechanism. The locking mechanism will be described in greater detail below with regard to FIG. 3.

In various examples, the second housing 220 may be configured to house utility equipment 222. The utility equipment 222 may be detachably coupled to the second housing 220, such that it may be removed and replaced. In some examples, the utility equipment 222 may be securely housed in the second housing 220 by a locking mechanism 224. In such examples, the locking mechanism 224 may include a strap, a clip, an adjustable bar, or the like. In some examples, the locking mechanism 224 may be coupled at one end to a portion of the utility rack 202 (e.g., base 208, first housing 216, second housing 220, support 214, rail 212, etc.). In some examples, the locking mechanism 224 may be coupled at another end to a same or a different portion of the utility rack 202. For example, the first housing 216 may include a coupling configured to receive a first end of strap (e.g., nylon strap, bungee cord, etc.) and a support 214 proximate the second housing 220 may include a second coupling configured to receive a second end of the strap.

As will be shown in greater detail below, the second housing 220 may include an opening configured to house at least a portion of the utility equipment 222 (e.g., chain saw, jaw saw, hedge trimmer, shears, and/or any other equipment). In the illustrative example, a blade of a chainsaw is inserted into the second housing 220, though this is merely for illustrative purposes, and it is contemplated that the second housing 220 may be configured to detachably couple any variety of utility equipment to the utility rack 202.

As illustrated in FIG. 2, the utility rack 202 may be coupled to the vehicle 200 via side coupling mechanisms 204 and rear coupling mechanisms 206. In the illustrative example, the side coupling mechanisms 204 and the rear coupling mechanisms 206 may include a fixed size (e.g., not adjustable). In such examples, the utility rack 202 may be configured to fit on a utility vehicle 200 of a particular size, shape, style, make, model, etc. (e.g., Polaris® RZR®, Can-Am® Commander™, etc.). Additionally, in the illustrative examples, the side coupling mechanisms 204 are fixed laterally and/or rotationally (e.g., not capable of being adjusted left, right, up, down, etc.). For example, the side coupling mechanisms 204 may include a fixed length. For another example, the rear coupling mechanisms 206 may be welded to the base 208 and/or rail 212 and may include a coupling at a fixed location. In other examples, the side coupling mechanisms 204 and/or the rear coupling mechanisms 206 may be adjustable. In such examples, the side coupling mechanism 204 and/or the rear coupling mechanisms 206 may be adjusted in at least a length to fit multiple different utility vehicles 200.

Figure 3:
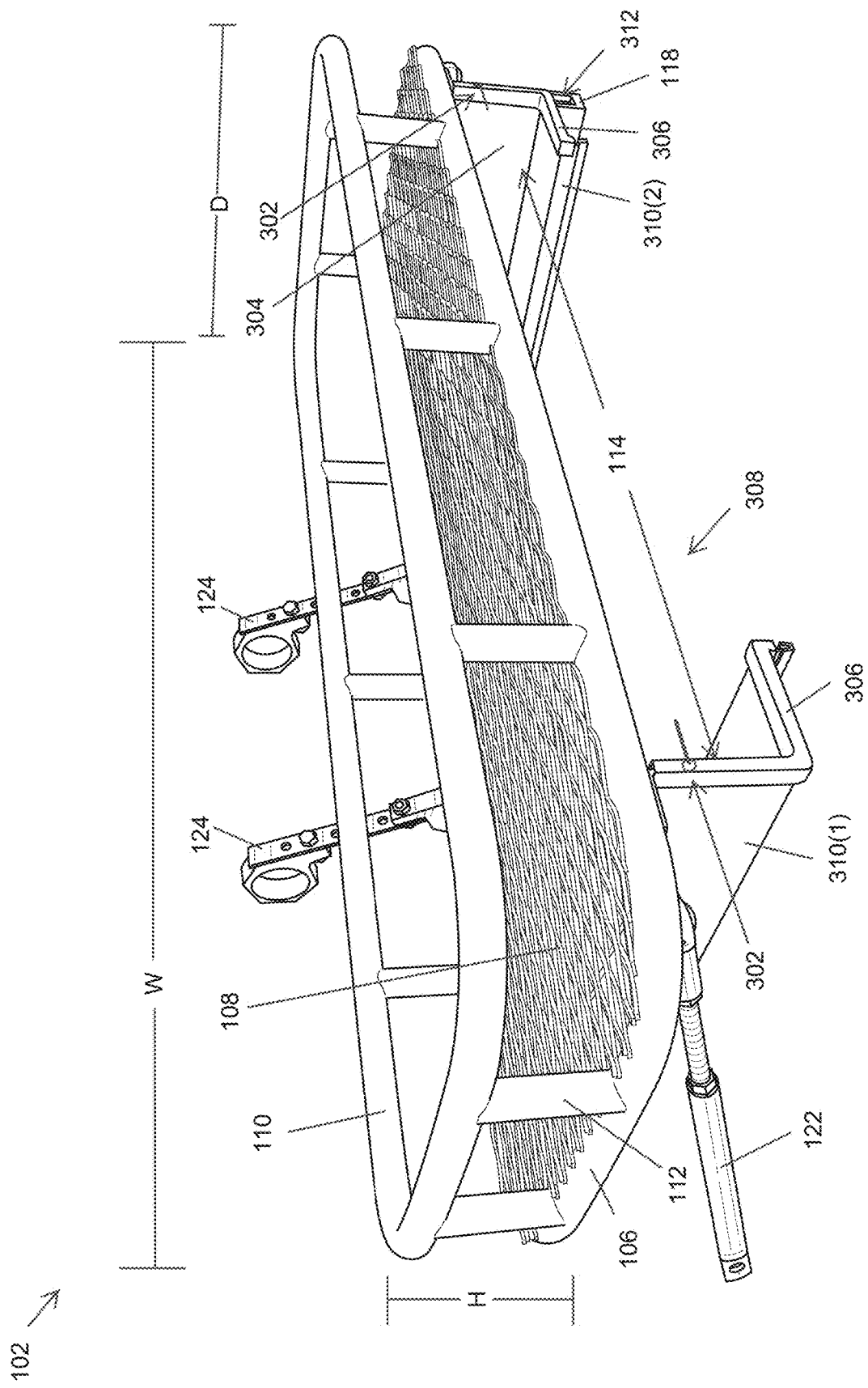
FIG. 3 is a front perspective view of an example utility rack with adjustable coupling mechanisms.

FIG. 3 is a front perspective view of an example utility rack 102 including side coupling mechanisms 122 and rear coupling mechanisms 124. The side coupling mechanisms 122 and the rear coupling mechanisms 124 may comprise a metal material, a plastic material, a composite material, or combinations of the foregoing. In the illustrative example, the side coupling mechanisms 122 and the rear coupling mechanisms 124 are adjustable (e.g., a length thereof is adjustable). In such examples, the utility rack 102 may be configured for use on various vehicles of different size, shape, make, model, etc. The side coupling mechanisms 122 and the rear coupling mechanisms 124 will be described in further detail below with respect to FIGS. 11-13.

As discussed above, the utility rack 102 may be configured to couple to a utility vehicle, such as utility vehicle 100. In various examples, the utility rack 102 may be configured to hold equipment, boxes, and the like. In some examples, the base 106 of the utility rack 102 may include width (W) of 30-50 inches. In at least one example, the base 106 may include a width (W) of 38 inches or 46 inches. In some examples, the base 106 of the utility rack 102 may include depth (D) of 10-24 inches. In at least one example, the base 106 may include a depth (D) of 16 inches.

As discussed above, the utility rack 102 may include a rail 110 coupled to the base 106 via a plurality of supports 112. In various examples, the rail 110 may be situated substantially parallel to the base 106. In some examples, the rail 110 may include dimensions substantially similar (e.g., less than 0.5 inches difference in width and/or depth) to the base 106. In some examples, a width and/or depth of the rail 110 may be between 0.5-4 inches larger or smaller than the base 106. In various example, the supports 112 may be sized such a height (H) between the base 106 and the rail 110 is situated between 2-12 inches. In at least one example, the supports 112 may be configured such that a height (H) between the base 106 and the rail 110 is 4 inches.

In various examples, the utility rack may include a first housing 114 and a second housing 118. The first housing 114 and the second housing 118 may be coupled to a base 106 and/or a storage surface 108. In such examples, the coupling may include one or more welds, bolts, screws, snap-fit connectors, glue, rope, or any other type of coupling for securably attaching two components of a utility rack 102. In various examples, the first housing 114 and the second housing 118 may be coupled to a bottom surface of the base 106. In such examples, the first housing 114 and the second housing 118 may be situated under the storage surface 108.

As discussed above, the first housing 114 may be configured to house a storage container, such as a container configured for storing liquid and/or solid material. In at least one example, the storage container may be configured to carry liquid materials, such as water, gasoline, diesel, or the like. The first housing 114 may be configured to detachably couple to the storage container, such that the storage container may be removed and replaced from the first housing 114. In various example, the first housing 114 may include one or more first locking mechanisms 302 configured to secure the storage container in place. In the illustrative example, the first locking mechanism 302 may include an adjustable bar configured to raise into a position for locking the storage container.

In some examples, the first locking mechanism 302 may include one or more convex protrusions on an inner surface 304 of the first housing 114. In such examples, the convex protrusion(s) may be configured to couple to one or more concave surfaces and/or indented surfaces of the storage container. Any other type of first locking mechanism 302 is contemplated herein to securably house the storage container in the first housing 114. In various examples, the first housing 114 may include caps 306 configured to secure the storage container in the first housing 114. In such examples, the caps 306 may extend a distance above the inner surface of the first housing 114 and may prevent the storage container from sliding out while a utility vehicle is moving.

In some examples, the first housing 114 may include a friction surface coupled, adhered or otherwise attached to an inner surface 304 thereof. The friction surface may include a rubber, plastic, or other type of coating to increase friction between the inner surface 304 and the storage container, such as to prevent movement of storage container within the first housing 114. In some examples, the friction surface may include a surface texture, such as a knurled surface, a pitted surface, or other machined surface configured to increase friction between surfaces.

In some examples, the first housing 114 may be a single containment unit configured to house the storage container. In such examples, the first housing 114 may include a single piece of metal, plastic, composite, and/or a combination thereof with an opening 308. In various examples, the opening 308 may be configured such that a containment unit may be inserted into the first housing 114. In some examples, a width (e.g., distance between a first inner surface 304 on a first inner side of the first housing 114 and a second inner surface 304 on a second inner side of the first housing 114) of the opening 308 and/or first housing 114 may be 30-46 inches wide, and 3-8 inches tall. In some examples, the first housing 114 may include a depth between 10-24 inches. In at least one example, the first housing may include a width of 35 inches, a height of 3.25 inches and a depth of 16 inches.

In some examples, the first housing 114 may include a two-piece containment unit. In such examples, the first housing 114 may include a first containment unit 310(1) and a second containment unit 310(2) spaced at a distance, defining the width of the first housing 114. As discussed above, the distance may be between 30 and 46 inches. In at least one example, the distance may be 35 inches.

In some examples, the second housing 118 may additionally or alternatively include a friction surface on an inner surface thereof. In various examples, the second housing 118 may be configured to house utility equipment, such as utility equipment 222. The utility equipment may be detachably coupled to the second housing 118, such that it may be removed and replaced. The utility equipment may include a chain saw, jaw saw, hedge trimmer, shears, and/or any other equipment. The utility equipment may be detachably coupled to the second housing 118, such that it may be removed and replaced. As illustrated in FIG. 3, the second housing 118 may include a second opening 312 configured to receive the utility equipment (or at least a portion thereof). For example, a second opening 312 may be configured to receive a blade of a chain saw.

In some examples, the second opening 312 may include a width between 0.5 inches and 6 inches. In at least one example, the width of the second opening 312 may be 1 inch. In some examples, the second opening 312 may include a height between 2 inches and 8 inches. In at least one example, the height of the second opening 312 may be 4 inches. In various examples, the second housing 118 may be configured with a depth of 10-24 inches. In at least one example, the second housing 118 depth may be 16 inches.

In examples in which the second housing 118 includes the friction surface, the friction surface may assist in securing the utility equipment in the second housing 118. In some examples, the second housing 118 may include a second locking mechanism (not shown). The second locking mechanism, such as locking mechanism 224 may be configured to secure the utility equipment in the second housing 118, such as to ensure that it does not fall out when a vehicle to which the utility rack 102 is coupled moves (e.g., accelerates, travels uphill, on a bumpy trail/road, etc.). The second locking mechanism may include a mechanism like first locking mechanism 302, attachment points for a rope, a bungee, or the like.

Figure 4:
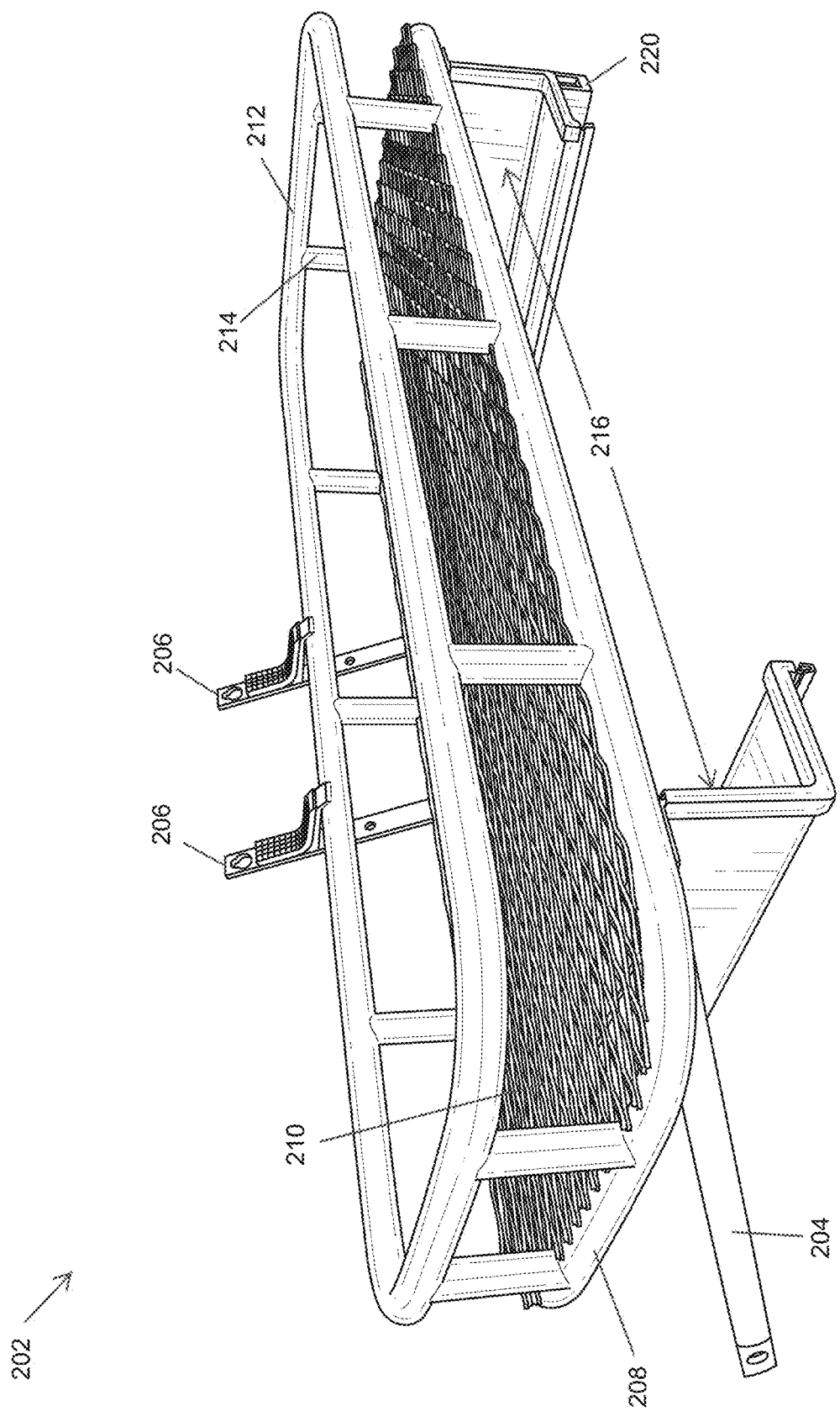
FIG. 4 is a front perspective view of an example utility rack with fixed coupling mechanisms.

FIG. 4 is a front perspective view of an example utility rack 202, such as utility rack 102, with side coupling mechanisms 204 and rear coupling mechanisms 206. The side coupling mechanisms 204 and the rear coupling mechanisms 206 may comprise a metal material, a plastic material, a composite material, or combinations of the foregoing. In the illustrative example, the side coupling mechanisms 204 and the rear coupling mechanisms 206 are fixed (e.g., not adjustable longitudinally, laterally, rotationally, etc.). In such examples, the utility rack 202 may be configured for use on a vehicle of a particular size, shape, make, model, etc.

In various examples, the rear coupling mechanism 206 may be coupled to a base 208 and/or a rail 212 of the utility rack 202. In various examples, the rear coupling mechanism 206 may be welded to the base 208 and/or the rail 212. In some examples, the rear coupling mechanism 206 may be coupled to the base 208 and/or the rail 212 via one or more fasteners (e.g., bolts, screws, snap-fit fasteners, etc.).

In various examples, the utility rack 202 may include a first housing 216, such as first housing 114 and a second housing 220, such as second housing 118, as described above. In various examples, the first housing 216 and/or second housing 220 may include one or more of the locking mechanisms described above, friction surfaces, and/or any of the features described above with regard to the first housing 114 and the second housing 118.

In various examples, the first housing 216 may include a single containment unit configured to house the storage container. In such examples, the first housing 1408 may include a single piece of metal, plastic, composite, and/or a combination thereof with an opening.

Figure 5:
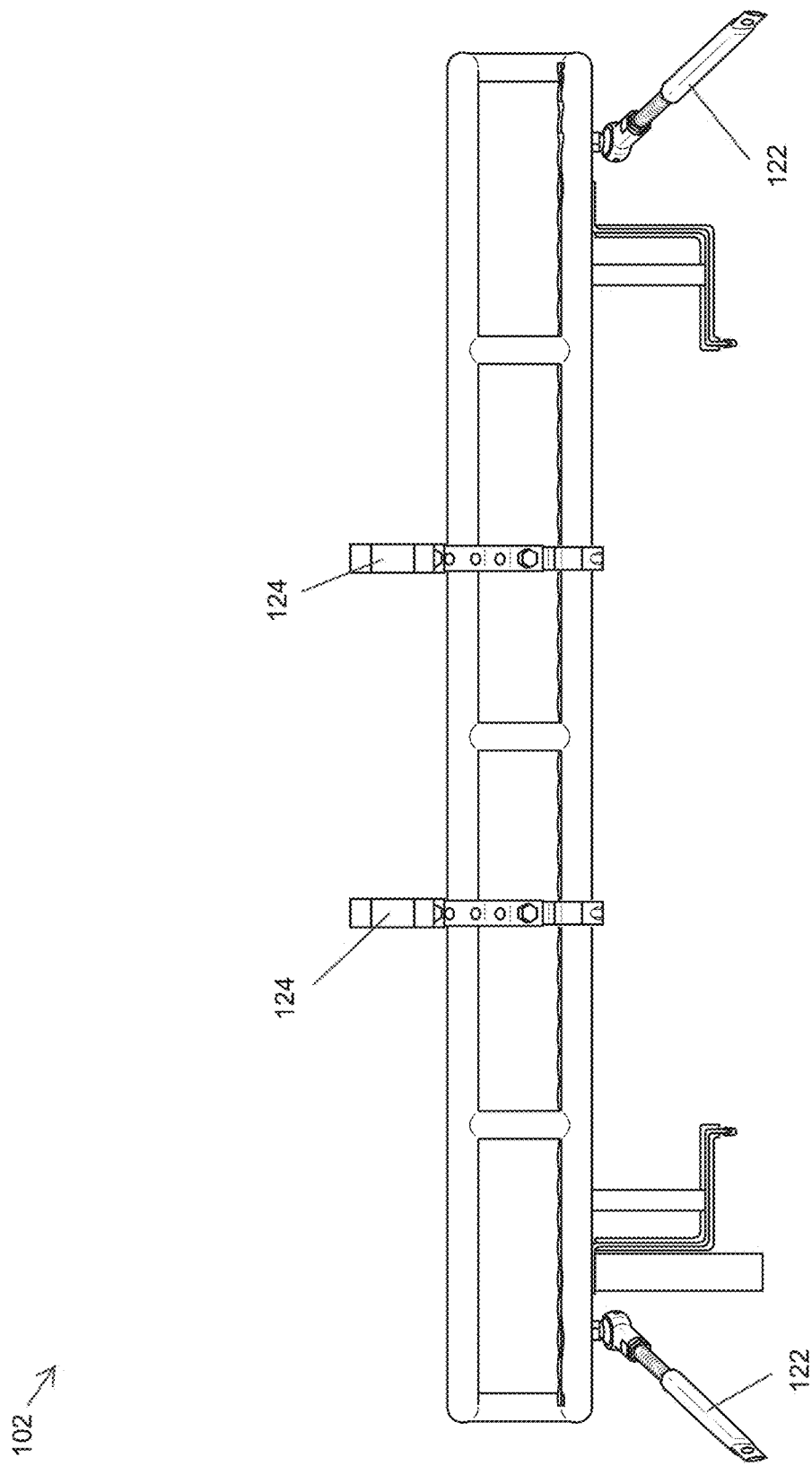
FIG. 5 is a rear view of an example utility rack with adjustable coupling mechanisms.

FIG. 5 is a rear view of an example utility rack 102 with adjustable couplings, such as side coupling mechanisms 122 and rear coupling mechanisms 124, as described herein.

Figure 6:
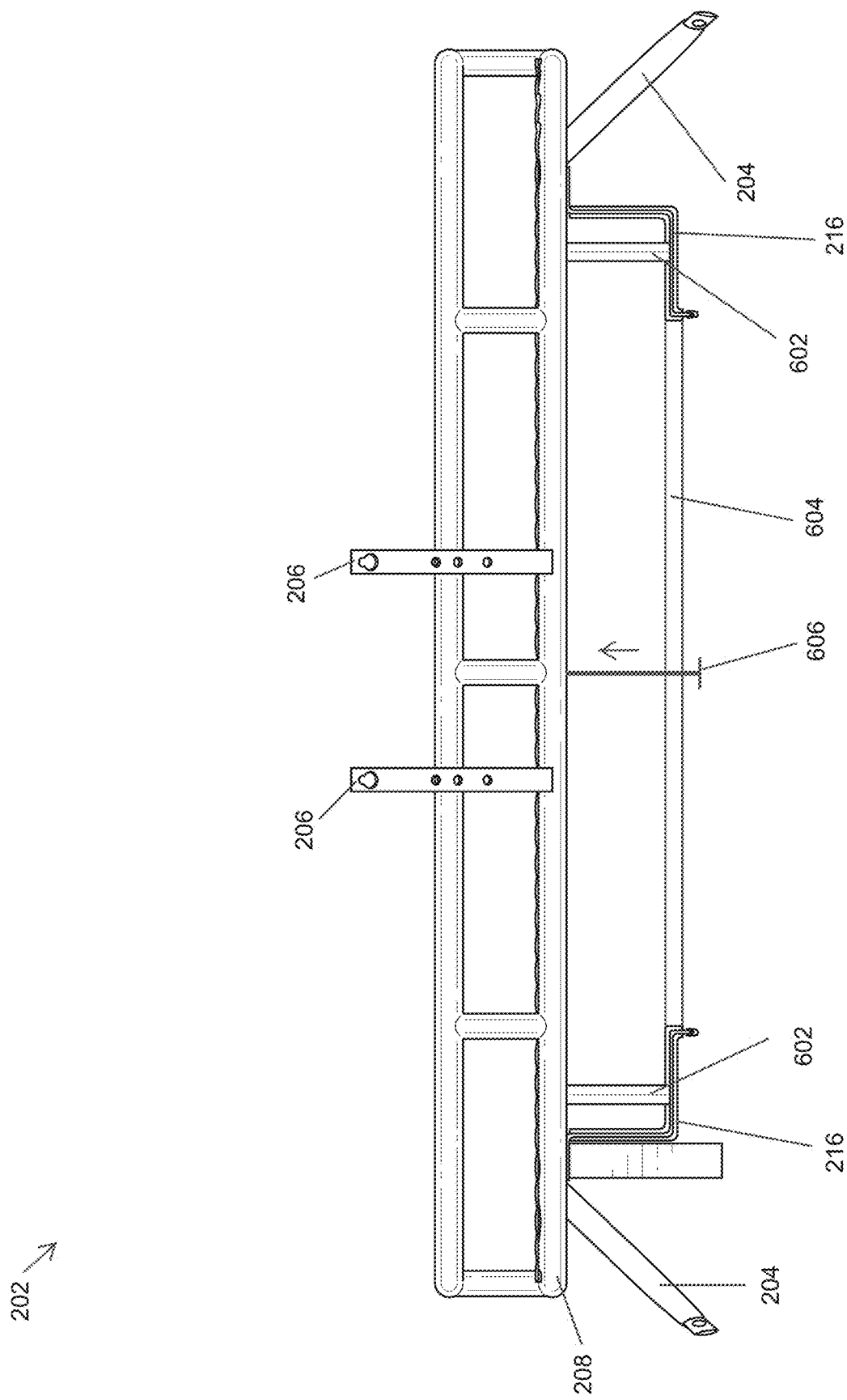
FIG. 6 is a rear view of an example utility rack with fixed coupling mechanisms.

FIG. 6 is a rear view of an example utility rack 202 with fixed couplings, such as side coupling mechanisms 204 and rear coupling mechanisms 206, as described herein. In the illustrative example, the utility rack 202 may include one or more rear supports 602. In at least one example, the rear support(s) 602 may prevent a storage container from sliding or otherwise moving out of the first housing 216. In the illustrative example, the rear support(s) 602 extend vertically from a bottom portion of the first housing 216 to a top portion of the first housing. In other examples, the rear support(s) 602 may extend horizontally from a first side of the first housing 216 to a second, opposite side of the first housing 216.

In some examples, the first housing 216 may include the rear support(s) 602. In such examples, the rear support(s) 602 may be a portion of the first housing 216, such as welded or otherwise coupled to the first housing 216. In some examples, the rear support(s) 602 may be coupled to the first housing 216 at a first end and coupled to the base 208 or other portion of the utility rack at the other end.

In various examples, the utility rack 202 may additionally or alternatively include a bottom support 604. In some examples, the bottom support 604 may be a portion of the first housing 216. In such examples, the first housing may be substantially U-shaped. In various examples, the bottom support 604 may provide support for the storage container, to prevent movement of the storage container while housed in the first housing 216.

Additionally or alternatively, the utility rack 202 may include a storage container support 606. In the illustrative example, the storage container support 606 extends vertically from the base 208 of the utility rack 202. In at least one example, the storage container support may include a coupling nut with a T-shaped handle. In various examples, the storage container support 606 may couple to an opening (e.g., threaded hole) in at least one of a longitudinal frame or a lateral frame (e.g., support frame 902, 1002, etc.) of the utility rack 202. In such an example, the storage container support 606 may be configured to couple to the at least one of the longitudinal or lateral frame. In at least one example, the storage container support 606 may extend through an opening in a storage container and couple to a coupling at or proximate the center of the base 208 of the utility rack 202. In such an example, the storage container may be securely fastened in place, with the storage container support preventing sagging, slipping, or any other type of movement of the storage container when housed in the first housing 216.

Figure 7:
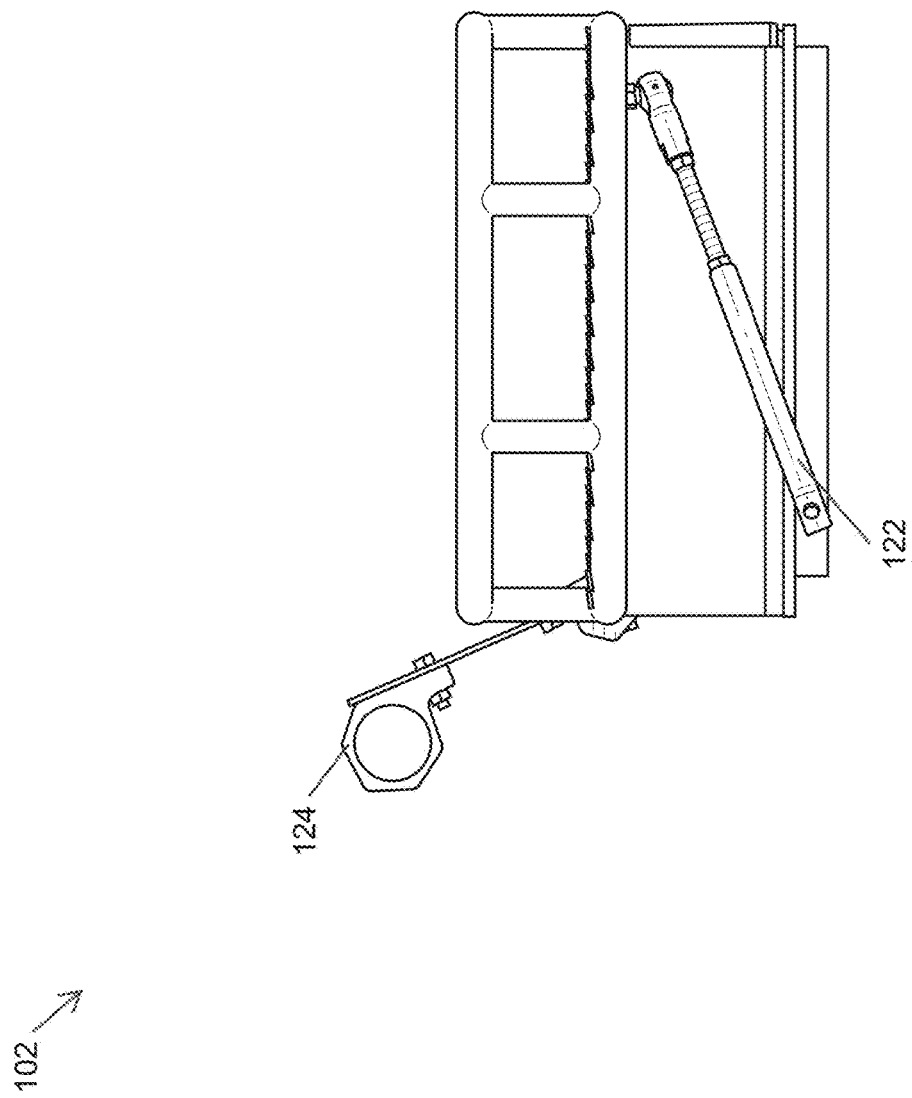
FIG. 7 is a side view of an example utility rack with adjustable coupling mechanisms.

FIG. 7 is a side view of an example utility rack 102 with adjustable couplings, such as side coupling mechanisms 122 and rear coupling mechanisms 124, as described herein.

Figure 8:
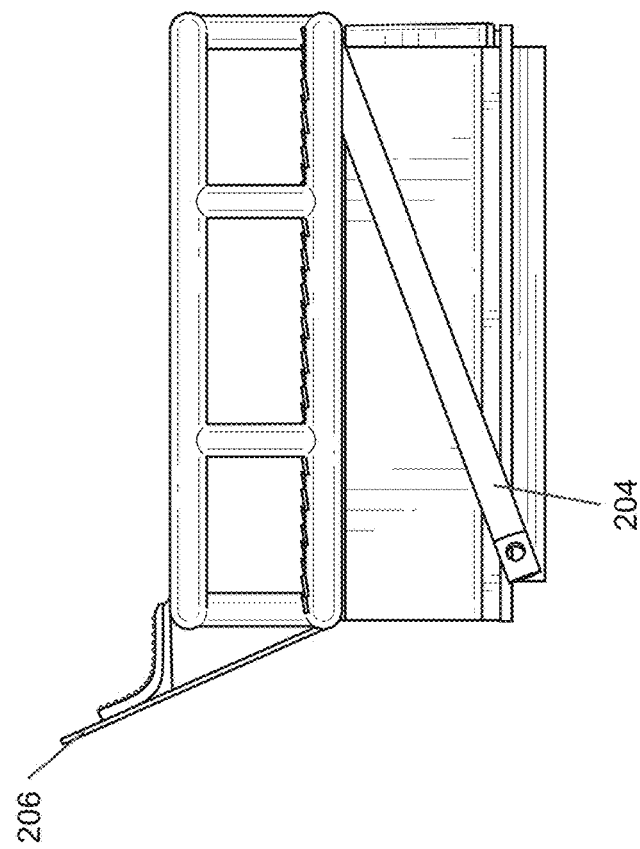
FIG. 8 is side view of an example utility rack with fixed coupling mechanisms.

FIG. 8 is side view of an example utility rack 202 with fixed couplings, such as side coupling mechanisms 204 and rear coupling mechanisms 206, as described herein. In various examples, the rear coupling mechanisms 206 may be configured to couple to a portion of a utility vehicle, such as via a collar-style clamp, locking clamp, band clamp, or the like.

Figure 9:
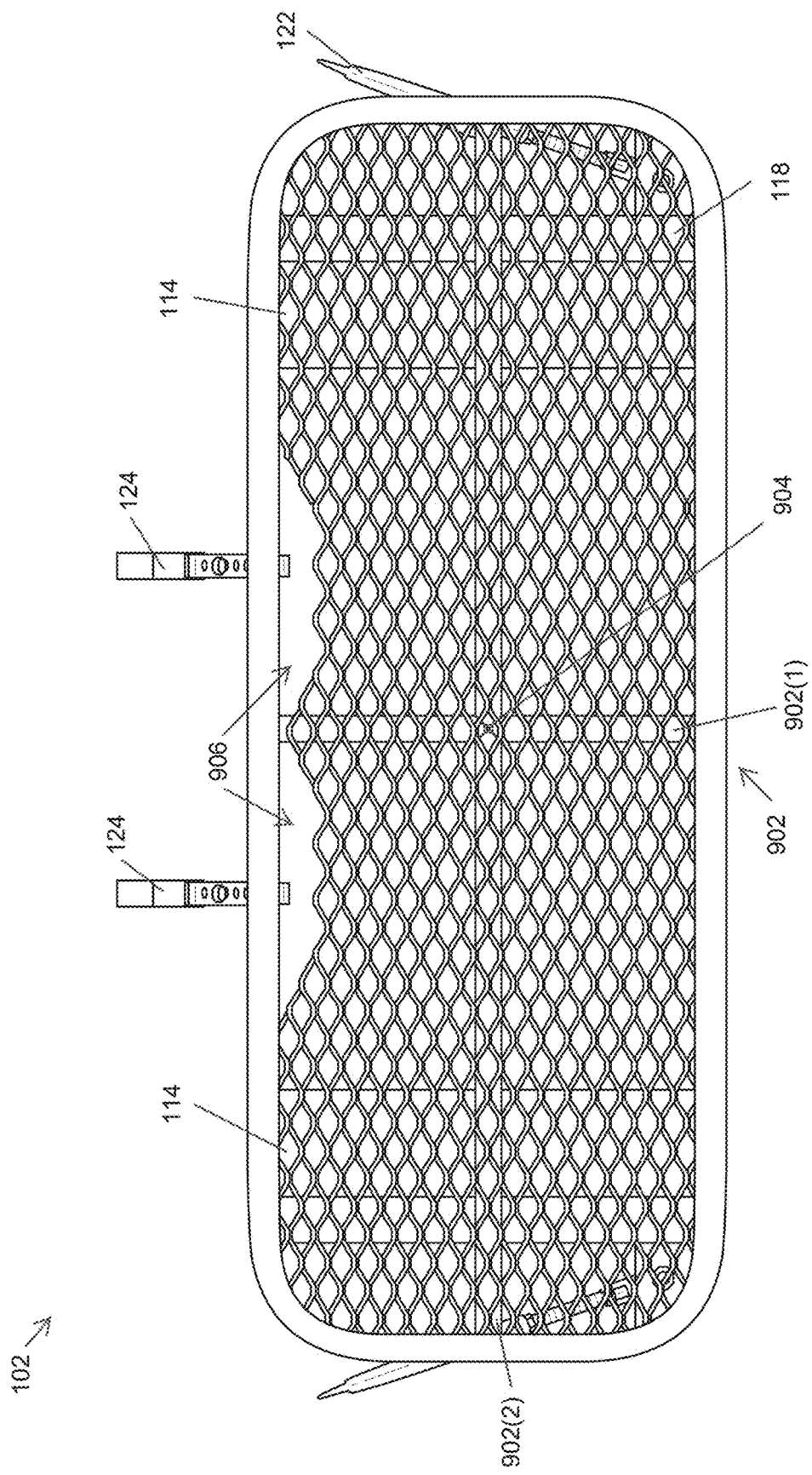
FIG. 9 is a top view of an example utility rack with adjustable coupling mechanisms.

FIG. 9 is a top view of an example utility rack 102 with adjustable couplings, such as side coupling mechanism 122 and rear coupling mechanism 124, as described herein. As discussed above, the utility rack 102 may include a storage surface 108 coupled to the base 106. In various examples, the base 106 may include a support frame 902. The support frame 902 may extend from a first inner surface of the base 106 to a second (opposite) inner surface of the base. The support frame 902 may be a portion of the base 106, such as machined as a single piece. In some examples, the support frame 902 may be coupled to the base, such as via couplings (e.g., clamp couplings, screws, bolts, rivets, etc.).

The support frame 902 may include one or more lateral frames 902(1) and one or more longitudinal frames 902(2). The lateral frame(s) 902(1) and longitudinal frame(s) 902(2) may comprise a metal material, a plastic material, a composite material, or combinations of the foregoing. In some examples, the support frame 902 may be proximate to and configured to provide support to the storage surface in a vertical direction. In such examples, weight placed on the storage surface may further be supported by the support frame 902. In various examples, the storage surface 108 may be welded or otherwise coupled to the support frame 902 of the base 106. Additionally, the first housing 114 and/or the second housing 118 may be coupled to the support frame 902 of the base 106, such as via a weld, bolt, screw, or the like.

In various examples, support frame 902 may include an opening 904 in at least one of the lateral frame 902(1) or the longitudinal frame 902(2). The opening 904 may be configured to receive a storage container support, such as storage container support 606. In some examples, the opening 904 may include a threaded hole into which the storage container support may be securely fastened. In such examples, the storage container support may be configured to securely support a storage container housed within a housing of the utility rack 102. For example, the storage container support may include a coupling screw with a T-shaped handle. The coupling screw may be securely held within the opening 904 to prevent sagging, slipping, or any other type of movement of the storage container when housed in the housing.

In the illustrative example, the storage surface 108 comprises a latticed structure. In other examples, the storage surface 108 may comprise a substantially smooth surface, a surface with horizontal and vertical cross-supports (e.g., checkered), or the like. The storage surface 108 may comprise a metal material, a plastic material, a composite material, or combinations of the foregoing. In various examples, the storage surface 108 may include a friction surface on a top (e.g., on which equipment is stored) and/or bottom side (e.g., proximate the lateral frame(s) 902(1) and/or the longitudinal frame(s) 902(2). The friction surface may include a rubber, plastic, or other type of coating to increase friction between the storage surface 108 and equipment, boxes, and/or other items placed thereon, such as to prevent movement of the equipment, boxes, and/or other items. In some examples, the friction surface may include a surface texture, such as a knurled surface, a pitted surface, or other machined surface configured to increase friction between surfaces.

In various examples, the storage surface 108 may include cut-outs 906. In various examples, the cut-outs may be configured to permit movement of the rear coupling mechanisms 124 laterally along the base 106. In such examples, the rear coupling mechanisms 124 may be adjusted to fit vehicles of different sizes, shapes, makes, models, etc.

Figure 10:
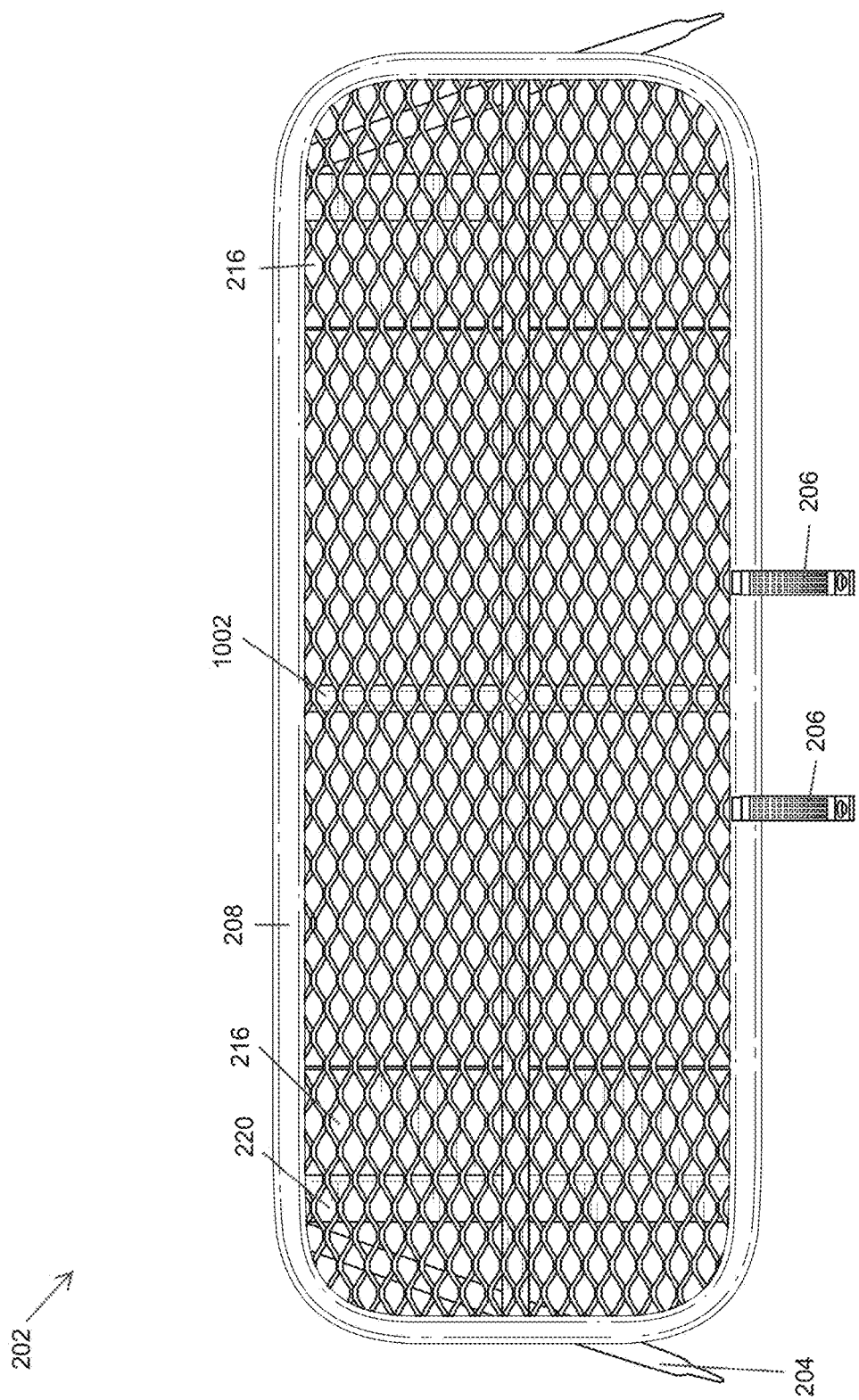
FIG. 10 is a top view of an example utility rack with fixed coupling mechanisms.

FIG. 10 is a top view of an example utility rack 202 with fixed couplings, such as side coupling mechanisms 204 and rear coupling mechanisms 206, as described herein. In various examples, the base 208 may include a support frame 1002, such as support frame 902. The support frame 1002 may comprise a metal material, a plastic material, a composite material, or combinations of the foregoing. In various examples, the storage surface 210 may be welded or otherwise coupled to the support frame 1002 of the base 208. Additionally, the first housing 216 and/or the second housing 220 may be coupled to the support frame 1002 of the base 208, such as via a weld, bolt, screw, or the like.

In the illustrative example, the storage surface 210 comprises a latticed structure. In other examples, the storage surface 210 may comprise a substantially smooth surface (e.g., sheet of metal), a surface with horizontal and vertical cross-supports (e.g., checkered), or the like. The storage surface may comprise a metal material, a plastic material, a composite material, or combinations of the foregoing. In various examples, the storage surface 210 may include a friction surface coupled or adhered thereto. The friction surface may include a rubber, plastic, or other type of coating to increase friction between the second surface 210 and equipment, boxes, and/or other items placed thereon, such as to prevent movement of the equipment, boxes, and/or other items. In some examples, the friction surface may include a surface texture, such as a knurled surface, a pitted surface, or other machined surface configured to increase friction between surfaces.

Figure 11:
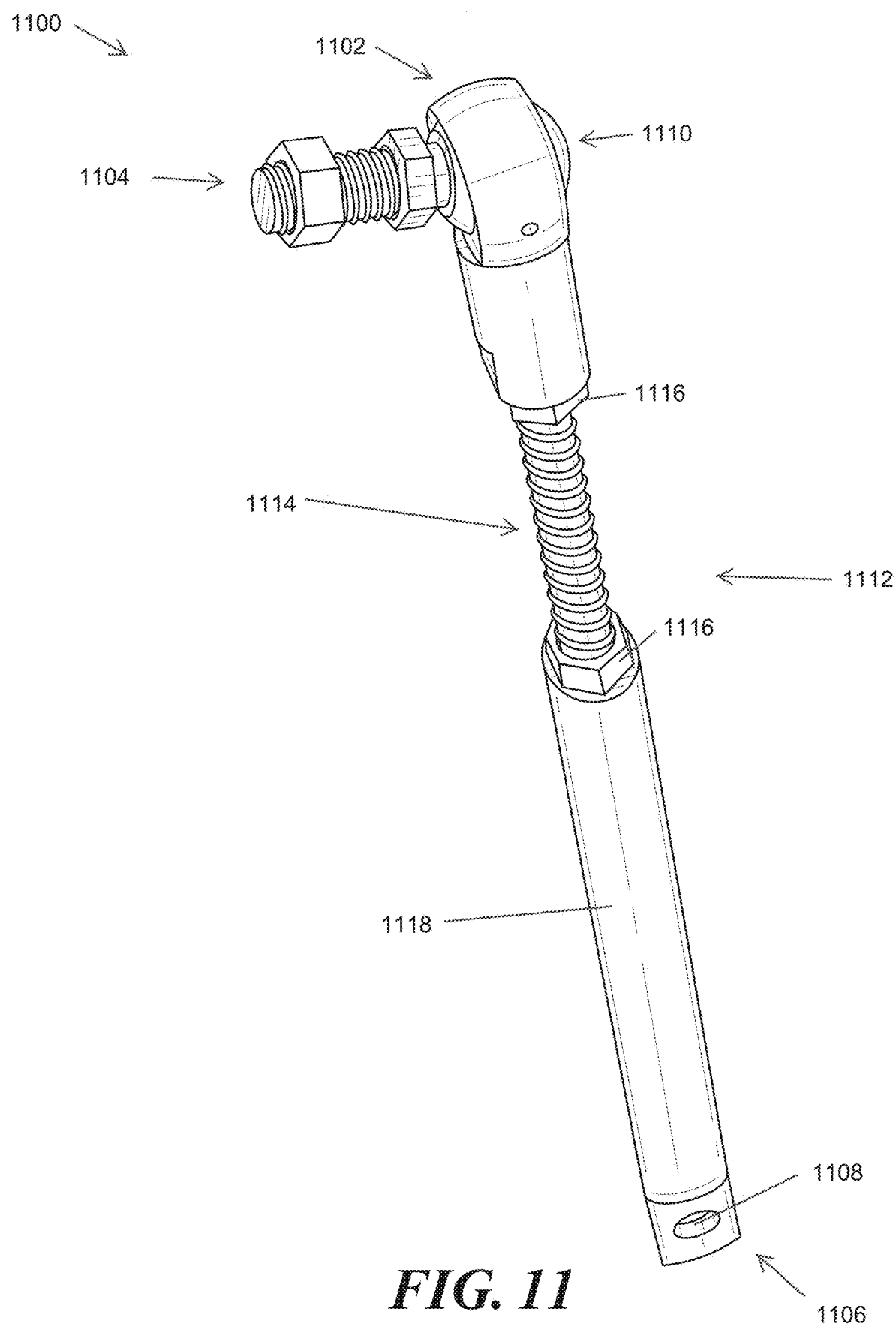
FIG. 11 depicts an example adjustable side coupling mechanism for use on a utility rack.

FIG. 11 depicts an example adjustable side coupling mechanism 1100, such as side coupling mechanism 122, for use on a utility rack. The side coupling mechanism 1100 may include a first end 1102 configured with a first coupling 1104 configured to couple to a base and/or housing of the utility rack. The first coupling 1104 may include a screw, bolt, band (e.g., rubber band, plastic band, etc.), rope, or other type of coupling.

The side coupling mechanism 1100 may include a second end 1106 with a second coupling 1108 configured to couple to a column bracket or other bracket of a vehicle and/or coupled to the vehicle. The second coupling 1108 may include a screw, bolt, band (e.g., rubber band, plastic band, etc.), rope, or other type of coupling. In at least one example, the second coupling 1108 may include a hole configured for a bolt to pass through the second coupling 1108 and a column bracket coupled around a bar of the vehicle.

In various examples, the side coupling mechanism 1100 may be adjustable. In the illustrative example, the first end 1102 of the side coupling mechanism 1100 includes a ball joint 1110 to permit lateral (e.g., side-to-side) and/or rotational movement of an arm 1112 of the side coupling mechanism 1100. In other examples, the side coupling mechanism 1100 may include other types of joints to permit lateral and/or rotational movement of the arm 1112. In some examples, such as examples with fixed side coupling mechanisms 1100, the first end 1102 may include a fixed joint. In such examples, the fixed joint may substantially preclude lateral and/or longitudinal movement of the arm 1112 from a fixed position set based on a coupling between the first end 1102 and the base and/or housing of the utility rack.

In some examples, the arm 1112 may be fixed in length. In such examples, the arm 1112 may include a length configured for a particular vehicle. As illustrated in FIG. 11, the arm 1112 may be adjustable, such as via adjuster 1114. In such examples, the length of the arm 1112 may be adjusted for coupling to vehicles of various sizes and/or shapes.

In the illustrative example, the adjuster 1114 may include two fasteners 1116 on opposing ends of the adjuster 1114. In such an example, the arm 1112 may be lengthened or shortened by adjusting a position of one or both fasteners 1116. In some examples, the fasteners 1116 may secure a respective adjuster 1114 in place, such as to maintain a determined (e.g., set) length. In other examples, the adjuster 1114 may be lengthened and/or shortened by twisting the second end 1106 such that a column 1118 of the arm may move closer to and/or farther from the first end 1102. In various examples, the adjuster 1114 may include a hydraulic and/or pneumatic cylinder. In such examples, the adjuster 1114 may be configured to shorten and/or lengthen the arm 1112 of the side coupling mechanism 1100 based on an adjustment to fluid and/or air pressure. Though specific examples of adjusters 1114 capable of modifying a length of a side coupling mechanism 1100 are discussed herein, any other mechanical adjuster for increasing or decreasing the length of the arm 1112 is contemplated herein.

FIG. 12 depicts an example adjustable rear coupling mechanism 1200, such as rear coupling mechanism 124, for use on a utility rack. In various examples, the rear coupling mechanism 1200 may include a first coupler 1202 and a second coupler 1204. In the illustrative example, the first coupler 1202 and the second coupler 1204 are configured for coupling to a substantially cylindrical bar. Though this is merely an example for illustrative purposes, and any other type of coupling for a cylindrical, or other shaped bar or surface of the vehicle and/or utility rack is contemplated. For example, the first coupler 1202 and/or the second coupler 1204 may include a collar-style clamp, locking clamp, band clamp, or the like.

In various examples, the first coupler and/or the second coupler 1204 may be configured to couple to a base, such as base 106, and/or a rail, such as rail 110, of the utility rack and/or a bar or another surface of a vehicle, such as vehicle 100. In various examples, the first coupler 1202 and/or the second coupler 1204 may include a friction surface coupled, adhered, or otherwise attached to an inner surface 1206. The friction surface may include a rubber, plastic, or other type of coating to increase friction between the first coupler 1202 and/or the second coupler 1204 and the base, rail, bar, and/or other surface, such as to prevent movement of the first coupler 1202 and/or second coupler 1204. In some examples, the friction surface may not be adhered to the first coupler 1202 and/or the second coupler 1204. In such examples, the friction surface may be configured to rest in between an inner surface of the first coupler 1202 and/or the second coupler 1204 and an outer surface of the base and/or the rail (e.g., first coupler 1202) and/or the bar or other surface of the vehicle (e.g., second coupler 1204). For example, the friction surface may include a rubber matting configured to line an inner surface of the first coupler 1202 and/or the second coupler 1204. In some examples, the friction surface may additionally be used as a spacer, to assist in fitting the respective coupler 1202 and/or 1204 on components of the vehicle and/or the utility rack. For example, a first coupler 1202 may be configured to couple to a two-inch roll bar of a vehicle. The first coupler 1202 may have attached thereto, on an inner surface, a rubber matting as a friction surface. The rubber matting between the inner surface of the first coupler 1202 and the roll bar may enable the first coupler 1202 to securably couple to a 1¾ inch roll bar. In some examples, the friction surface may be machined into an inner surface of the first coupler 1202 and/or the second coupler 1204. In such examples, the friction surface may include a knurled surface, a pitted surface, or other machined surface configured to increase friction between surfaces.

In various examples, the first coupler 1202 and/or the second coupler 1204 may couple to an adjustment bar 1208 via one or more fasteners 1210. In the illustrative example, the fastener(s) 1210 include bolts and nuts. In other examples, other types of fasteners may be used, such as screws, snap-fit connectors, or the like. In various examples, the adjustment bar 1208 may include holes 1212 to which the first coupler 1202 and/or the second coupler 1204 may couple. In some examples, the adjustment bar 1208 may include at least 2 holes 1212, one for each of the first coupler 1202 and the second coupler 1204. In other examples, such as that illustrated in FIGS. 12 and 13, the adjustment bar 1208 may include a plurality of holes. In such examples, positions associated with the first coupler 1202 and the second coupler 1204 may be adjusted up and down the adjustment bar 1208, to adjust a length of the rear coupling mechanism 1200, such as to fit on different vehicles.

In the illustrative example, the second coupler 1204 may include a first portion 1214 and a second portion 1216. In such an example, the first portion 1214 and the second portion 1216 may be coupled together via one or more coupler fasteners 1218. The coupler fasteners 1218, such as fastener(s) 1210, may include bolts, screws, snap-fit fasteners, or the like. In various examples, the first portion 1214 and the second portion 1216 may be separated from one another to allow the second coupler 1204 (e.g., the first portion 1214 and the second portion 1216) to fit around a bar or other structure (e.g., roll bar of a vehicle, etc.). In some examples, the second coupler 1204 may include a solid piece, such as that depicted for the first coupler 1202. In such example, the second coupler 1204 may be permanently affixed to a base and/or rail of the utility rack.

Though illustrated as a solid piece, the first coupler 1202 may additionally include a first portion and a second portion, such as that described above with regard to the second coupler 1204. In such an example, the first coupler 1202 may be configured to be removably coupled to a bar or other structure (e.g., roll bar of a vehicle, base and/or rail of the utility rack, etc.) to couple to a bar or other structure of a vehicle.

In various examples, both of the first coupler 1202 and the second coupler 1204 may be configured to couple to a base and/or rail of the utility rack and/or the bar or other structure of the vehicle. In the illustrative example, the first coupler 1202 includes a larger diameter than the second coupler 1204. However, this is merely for illustrative purposes, and it is contemplated that the first coupler 1202 and the second coupler 1204 may be substantially the same diameter, and/or a diameter of the second coupler 1204 may be larger than a diameter of the first coupler 1202.

FIG. 13 is an exploded view of components of the adjustable rear coupling mechanism 1200 of FIG. 12.

Figure 14:
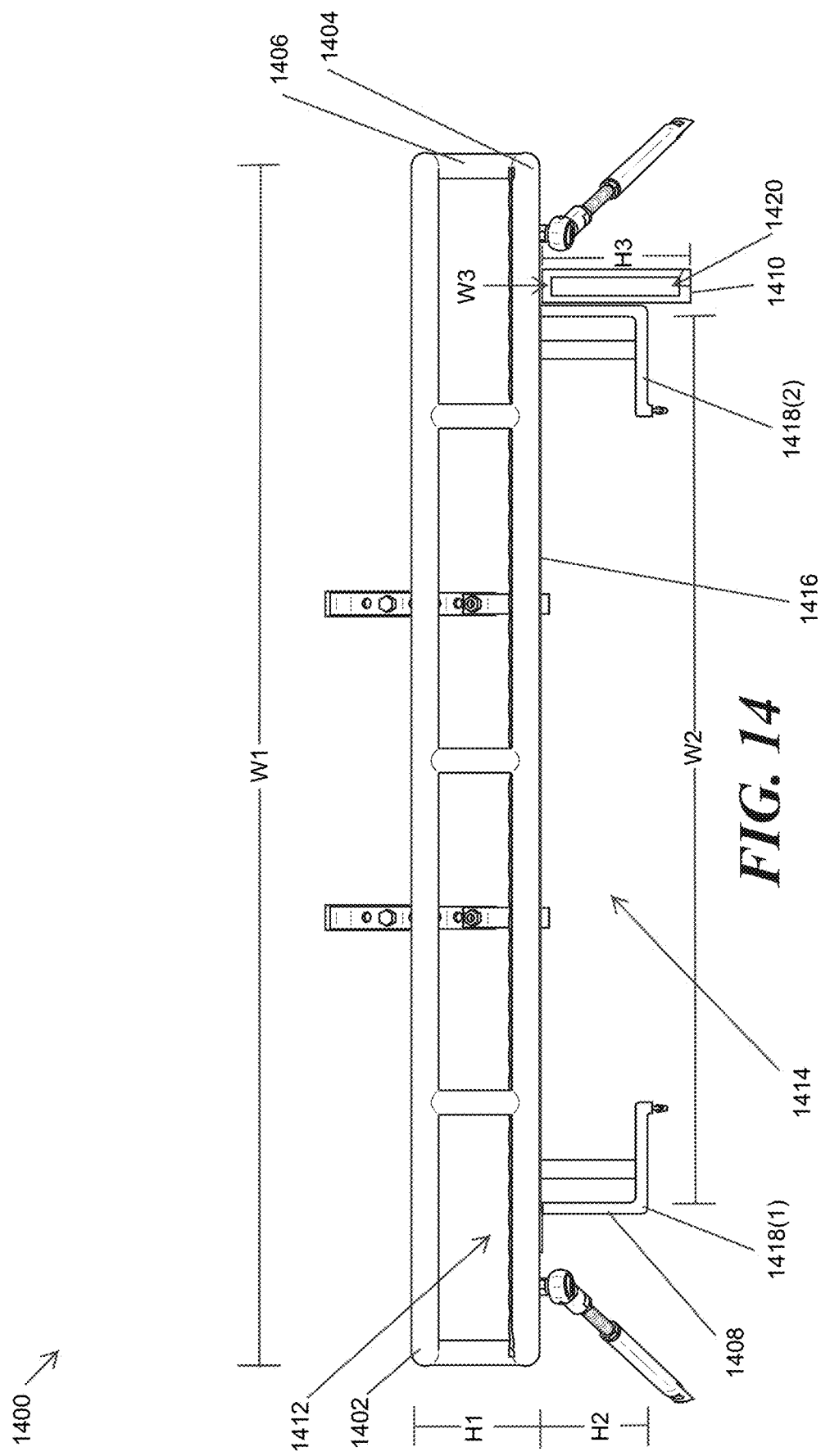
FIG. 14 is a front view of an example utility rack, as described herein.

FIG. 14 is a front view of an example utility rack 1400, such as utility rack 102 and/or utility rack 202. As discussed above, the utility rack 1400 may include a rail 1402, such as rail 110 and/or rail 212, coupled to a base 1404, such as base 106 and/or base 208 via a plurality of supports 1406, such as supports 112 and/or supports 214. In various examples, the rail 1402 may be situated substantially parallel to the base 1404. In some examples, the rail 1402 may include dimensions substantially similar (e.g., less than 0.5 inches difference in width and/or depth) to the base 1404. In some examples, a width and/or depth of the rail 1402 may be between 0.5-4 inches larger or smaller than the base 1404. In various examples, the rail 1402 and/or the base 1404 may include a width (W1) between 30-50 inches. In at least one example, the rail 1402 and/or base 1404 may include a width (W1) of 38 inches or 46 inches.

As illustrated above, the rail 1402 and/or the base 1404 of the utility rack 1400 may include depth of 10-24 inches. In at least one example, the rail 1402 and/or the base 1404 may include a depth of 16 inches.

In various examples, the rail 1402 and the base 1404 of the utility rack 1400 may be situated a distance from one another such that the rail 1402 is a height (H1) above the base 1404. The height (H1) may be between 2-12 inches. In such examples, the supports 1406 may couple the base 1404 to the rail 1402 at the height (H1). In at least one example, the supports 112 may be configured such that a height (H1) between the base 106 and the rail 110 is 4 inches.

As discussed above, the utility rack 1400 may include a first housing 1408, such as first housing 114 and/or first housing 216 and a second housing 1410, such as second housing 118 and/or second housing 220. The first housing 1408 and the second housing 1410 may be coupled to a base 1404 and/or a storage surface 1412. In such examples, the coupling may include one or more welds, bolts, screws, snap-fit connectors, glue, rope, or any other type of coupling for securably attaching the two components to the utility rack 1400. In various examples, the first housing 1408 and the second housing 1410 may be coupled to a bottom surface of the base 1404. In such examples, the first housing 1408 and the second housing 1410 may be situated under the storage surface 1412.

As discussed above, the first housing 1408 may be configured to house a storage container, such as a container configured for storing liquid and/or solid material. In at least one example, the storage container may be configured to carry liquid materials, such as water, gasoline, diesel, or the like. The first housing 1408 may be configured to detachably couple to the storage container, such that the storage container may be removed and replaced from the first housing 1408. In various example, the first housing 1408 may include one or more first locking mechanisms configured to secure the storage container in place.

In some examples, the first housing 1408 may include a friction surface coupled, adhered or otherwise attached to an inner surface thereof. The friction surface may include a rubber, plastic, or other type of coating to increase friction between the inner surface and the storage container, such as to prevent movement of storage container within the first housing 1408. In some examples, the friction surface may include a surface texture, such as a knurled surface, a pitted surface, or other machined surface configured to increase friction between surfaces.

In some examples, the first housing 1408 may be a single containment unit configured to house the storage container. In such examples, the first housing 1408 may include a single piece of metal, plastic, composite, and/or a combination thereof with an opening 1414. In various examples, the opening 1414 may be configured such that a containment unit may be inserted into the first housing 1408. In some examples, a width (W2) (e.g., distance between a first inner surface on a first inner side of the first housing 1408 and a second inner surface on a second inner side of the first housing 1408) of the opening 1414 and/or first housing 1408 may be 30-46 inches wide. In at least one example, the first housing 1408 may include a width (W2) of 35 inches.

In some examples, the first housing 1408 may include a height (H2) between 3-8 inches tall. In at least one example, the first housing 1408 may include a height (H2) of 3.25 inches.

In some examples, the first housing 1408 may include a depth (not illustrated in FIG. 14) between 10-24 inches. In at least one example, the depth of the first housing 1408 may be 16 inches.

In the illustrative example, the first housing 1408 includes a single containment unit, with a top 1416 and two sides 1418(1) and 1418(2). In such an example, the top 1416 and/or the two sides 1418(1) and 1418(2) may be coupled to the base 1404 and/or the storage surface 1412. In some examples, the first housing 1408 may include a two-piece containment unit. In such examples, the first housing 1408 may include a first containment unit, such as first containment unit 310(1) and a second containment unit, such as second containment unit 310(2) spaced at a distance, defining the width (W2) of the first housing 1408. As discussed above, the width (W2) may be between 30-46 inches. In at least one example, the width (W2) may be 35 inches.

As discussed above, the utility rack 1400 may include a second housing 1410. In some examples, the second housing may include a friction surface on an inner surface thereof. In various examples, the second housing 1410 may be configured to house utility equipment, such as utility equipment 222. The utility equipment may be detachably coupled to the second housing 1410, such that it may be removed and replaced. The utility equipment may include a chain saw, jaw saw, hedge trimmer, shears, and/or any other equipment. The utility equipment may be detachably coupled to the second housing 1410, such that it may be removed and replaced. As illustrated in FIG. 14, the second housing 1410 may include a second opening 1420, such as second opening 312, configured to receive the utility equipment (or at least a portion thereof). For example, a second opening 1420 may be configured to receive a blade of a chain saw.

In some examples, the second opening 1420 may include a width (W3) between 0.5 inches and 6 inches. In at least one example, the width (W3) of the second opening 1420 may be 1 inch. In some examples, the second opening 1420 may include a height (H3) between 2 inches and 8 inches. In at least one example, the height of the second opening 1420 may be 4 inches. In various examples, the second housing 1410 and/or the second opening 1420 may be configured with a depth of 10-24 inches. In at least one example, the second housing 118 and/or second opening 1420 depth may be 16 inches.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A utility rack comprising:
a base;

a rail situated a distance from and parallel to the base;
at least two vertical supports extending from the base to the rail;
a storage surface coupled to a top surface of the base;
a first side coupling coupled to a first side of the base at a first end of the first side coupling and to a first component of a vehicle at a second end of the first side coupling;
a second side coupling coupled to a second side of the base at a first end of the second side coupling and to a second component of the vehicle at a second end of the second side coupling;
at least one rear coupling configured to couple to a third side of the base at a first end of the at least one rear coupling and a third component of the vehicle at a second end of the at least one rear coupling;
a first housing coupled to a bottom surface of the base, wherein the first housing is configured to house a storage container;
a second housing coupled to at least one of the bottom surface of the base or the first housing and configured to house at least a portion of a unit of utility equipment; and a support frame extending from a first inner surface of the base to a second inner surface of the base; wherein: the support frame is proximate to and configured to provide support in a vertical direction to the storage surface, and the support frame comprises a coupling; and a coupling screw configured to couple to the coupling at a first end of the coupling screw and secure the storage container within the first housing, wherein the coupling screw comprises a handle at a second end of the coupling screw.

2. The utility rack as claim 1 recites, wherein the storage container comprises a container configured to hold gasoline or diesel fuel.

3. The utility rack as claim 1 recites, wherein the second housing is configured to house a blade of a chainsaw.

4. The utility rack as claim 1 recites, wherein at least one of the at least one rear coupling, the first side coupling, or the second side coupling comprises an adjustable coupling.

5. The utility rack as claim 1 recites, wherein a top portion of the storage surface comprises a friction surface, the friction surface comprising at least one of:
a surface texture;
a plastic; or
a rubber.

6. The utility rack as claim 1 recites, wherein an inner surface of at least one of the first housing or the second housing comprises a friction surface, the friction surface comprising at least one of:
a surface texture;
a plastic; or
a rubber.

7. The utility rack as claim 1 recites, wherein the first housing further comprises at least one locking mechanism configured to secure the storage container in place within the first housing.

8. The utility rack as claim 1 recites, wherein the second housing further comprises a locking mechanism configured to secure the unit of utility equipment in place within the second housing.

9. A rack comprising:
a base;
a storage surface coupled to the base;
a first side coupling extending from the base, wherein the first side coupling extends from a first side of the base at a first end of the first side coupling and is configured to couple to a first component of a vehicle at a second end of the first side coupling;
a second side coupling extending from the base, wherein the second side coupling extends from a second side of the base at a first end of the second side coupling and is configured to couple to a second component of the vehicle at a second end of the second side coupling;
at least one rear coupling configured to couple to a third side of the base at a first end of the at least one rear coupling and a third component of the vehicle at a second end of the at least one rear coupling;
a first housing coupled to a bottom surface of the base, wherein the first housing is configured to house a storage container; and
a second housing coupled to at least one of the bottom surface of the base or the first housing and configured to house at least a portion of a unit of utility equipment;
wherein the at least one rear coupling comprises an adjustment bar, a first clamp coupling coupled to a first part of the adjustment bar, and a second clamp coupling coupled to a second part of the adjustment bar, wherein: the first clamp coupling is configured to couple to the third side of the base; and the second clamp coupling is configured to couple to the third component of the vehicle.

10. The rack as claim 9 recites, wherein the storage container comprises a container configured to hold gasoline or diesel fuel.

11. The rack as claim 9 recites, wherein the second housing is configured to house a blade of a chainsaw.

12. The rack as claim 9 recites, wherein at least one of the first clamp coupling or the second clamp coupling comprises a friction surface on an inner surface of a respective clamp coupling.

13. The rack as claim 9 recites, wherein the first side coupling comprises a first adjuster and the second side coupling comprises a second adjuster, the first adjuster and the second adjuster enabling the first side coupling and the second side coupling to be lengthened or shortened.

14. The rack as claim 13 recites, wherein the first adjuster comprises at least one first fastener and the second adjuster comprises at least one second fastener, the at least one first fastener and the at least one second fastener being configured to secure the first side coupling and the second side coupling at a determined length.

15. The rack as claim 9 recites, wherein an inner surface of at least one of the first housing or the second housing comprises a friction surface, the friction surface comprising at least one of:
a surface texture;
a plastic material; or
a rubber material.

16. The rack as claim 9 recites, wherein at least one of the first housing or the second housing comprises a locking mechanism configured to secure the storage container or the unit of utility equipment in place within a respective housing.

17. The rack as claim 9 recites, wherein the base, the storage surface, the first housing, and the second housing comprise at least one of:
aluminum;
steel; or
titanium.

* * * * *